(12) United States Patent
Hokao

(10) Patent No.: US 6,282,432 B1
(45) Date of Patent: Aug. 28, 2001

(54) DIGITAL CORDLESS TELEPHONE SET

(75) Inventor: Tomoaki Hokao, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/021,761

(22) Filed: Feb. 11, 1998

(30) Foreign Application Priority Data

Feb. 14, 1997 (JP) .................................................. 9-029486

(51) Int. Cl.⁷ .................................................... H04B 1/38
(52) U.S. Cl. ............................................. 455/552; 455/573
(58) Field of Search .................................. 455/573, 552, 455/553, 555, 426, 462, 465

(56) References Cited

U.S. PATENT DOCUMENTS

| | | | |
|---|---|---|---|
| 5,233,644 | * 8/1993 | Yamagata et al. | 455/462 |
| 5,243,641 | * 9/1993 | Evans et al. | 455/465 |
| 5,309,502 | * 5/1994 | Hirai | 455/426 |
| 5,448,619 | * 9/1995 | Evans et al. | 455/426 |
| 5,463,674 | * 10/1995 | Gillig et al. | 455/552 |
| 5,675,629 | * 10/1997 | Raffel et al. | 455/552 |
| 5,774,805 | * 6/1998 | Zicker | 455/426 |
| 5,818,918 | * 10/1998 | Fujii | 379/167 |
| 5,870,673 | * 2/1999 | Haartsen | 455/426 |
| 5,870,677 | * 2/1999 | Takahashi et al. | 455/463 |
| 5,884,188 | * 3/1999 | Hayes, Jr. | 455/552 |
| 5,901,357 | * 5/1999 | D'Avello et al. | 455/454 |
| 5,915,224 | * 6/1999 | Jonsson | 455/552 |
| 5,930,719 | * 7/1999 | Babitch et al. | 455/462 |

FOREIGN PATENT DOCUMENTS

| | | |
|---|---|---|
| 2295069 | * 5/1996 | (GB) . |
| 2 304 258 | 3/1997 | (GB) . |
| 5-153036 | 6/1993 | (JP) . |
| 6-252838 | 9/1994 | (JP) . |
| 7-240966 | 9/1995 | (JP) . |
| 8-79829 | 3/1996 | (JP) . |
| 8-172666 | 7/1996 | (JP) . |
| 8-237746 | 9/1996 | (JP) . |

\* cited by examiner

*Primary Examiner*—Dwayne Bost
*Assistant Examiner*—Joy K. Contee
(74) *Attorney, Agent, or Firm*—Scully, Scott Murphy & Presser

(57) ABSTRACT

In a digital cordless telephone set as a subsidiary unit, when both a radio wave from a radio base station connected to a public line and a radio wave from a master unit connected to a private line can be received, a sensor detects whether the subsidiary unit is placed on a charger. If the subsidiary unit is placed on the charger, the simultaneous wait mode is set while assigning the private line to a priority system and the public line to a nonpriority system. If the subsidiary unit is not placed on the charger, the simultaneous wait mode is set while assigning the public line to the priority system and the private line to the nonpriority system. In any case, the incoming call wait period of the nonpriority system is set to be longer than the normal period. With this arrangement, the frequency of turning on the main power supply of the subsidiary unit can be decreased to minimize power consumption in the incoming call wait mode.

3 Claims, 6 Drawing Sheets

DIGITAL CORDLESS TELEPHONE SET

BACKGROUND OF THE INVENTION

1. Field of the Invention

The present invention relates to a digital cordless telephone set and, more particularly, to a digital cordless telephone set capable of simultaneously waiting for a radio wave from a radio base station connected to a public line and a radio wave from a master unit connected from a private line and automatically controlling incoming call wait periods for the respective radio waves.

2. Description of the Prior Art

Conventionally, a cordless telephone set of this type, e.g., a cordless telephone set disclosed in Japanese Unexamined Patent Publication No. 8-237746 shown in FIG. 1 has a control section 23 which automatically selects connection of a subsidiary unit 21 to a radio base station or a master unit depending on whether the subsidiary unit 21 is placed on a charging unit 22. Upon detecting that the subsidiary unit 21 is placed on the charging unit 22, the line to be connected to the subsidiary unit 21 is set to a private line: otherwise, a public line is set as the line to be connected to the subsidiary unit 21, thereby performing switching control.

Additionally, as disclosed in Japanese Unexamined Patent Publication No. 8-172666, in an area where a radio wave from the radio base station of the private system can be received, the telephone set waits for a ringing signal from the radio base station of the private system. In an area where a radio wave from the radio base station of the public system can be received, the telephone set waits for a ringing signal from the radio base station of the public system. In an area where the radio waves from the radio base stations of both the public and private systems can be received, the telephone set waits for ringing signals from both the public and private systems.

In these prior arts, on the basis of whether the subsidiary unit is within the area where the radio wave from the radio base station connected to the public line or the radio base station (to be referred to as a master unit hereinafter) connected to the private line can be received or whether the subsidiary unit is placed on the charger, the telephone set determines to wait for the radio wave from the radio base station connected to the public line, the radio wave from the master unit connected to the private line, or the radio waves from both systems.

However, when the telephone set is to wait for both the radio wave from the radio base station connected to the public line and that from the master unit connected to the private line, the current consumption during the wait state is higher than that during which the telephone set is waiting for only one of the radio waves, so the continuous waitable time is shortened.

This is because the wait operation for the radio wave from the radio base station connected to the public line and the wait operation for the radio wave from the master unit connected to the private line are simply simultaneously performed (FIG. 2). Reference symbol Wt in FIG. 2 represents the period for waiting for the radio wave.

SUMMARY OF THE INVENTION

The present invention has been made in consideration of the above situation of the prior art, and has as its object to provide a subsidiary unit of a digital cordless telephone set which can minimize the current consumption in simultaneously waiting for a radio wave from a radio base station connected to a public line and that from a master unit connected to a private line when both the radio waves can be received.

In order to achieve the above object, according to the first aspect of the present invention, there is provided a digital cordless telephone set as a subsidiary unit, comprising a receiver capable of receiving both a radio wave from a radio base station and a radio wave from a master unit, means for detecting that both the radio wave from the radio base station and the radio wave from the master unit can be received, means for switching between whether only one of the radio wave from the radio base station and the radio wave from the master unit is received and whether both the radio waves are simultaneously received, means for detecting whether the subsidiary unit is placed on a charger, and means for assigning one of a private line and a public line to a priority system and the other to a nonpriority system.

According to the second aspect of the present invention, there is provided a digital cordless telephone set of the first aspect, wherein when it is detected that the subsidiary unit is placed on the charger, the private line is assigned to the priority system and the public line is assigned to the nonpriority system, and when the subsidiary unit is not placed on the charger, the public line is assigned to the priority system and the private line is assigned to the nonpriority system.

According to the third aspect of the present invention, there is provided a digital cordless telephone set of the first aspect, wherein incoming call wait periods of the priority system and the nonpriority system are changeable.

According to the fourth aspect of the present invention, there is provided a digital cordless telephone set of the first aspect, wherein the telephone set has a function of automatically controlling incoming call wait periods of the priority system and the nonpriority system.

As is apparent from the above description, the first effect of the present invention is that when the subsidiary unit of the digital cordless telephone set can receive both the radio wave from the radio base station connected to the public line and that from the master unit connected to the private line, the radio wave from the line which is more likely to receive a call can be effectively waited for.

This is because the sensor detects whether the subsidiary unit is placed on the charger, and when the subsidiary unit is placed on the charger, the radio wave from the master unit connected to the private line is preferentially waited for, and when the subsidiary unit is not placed on the charger, the radio wave from the radio base station connected to the public line is preferentially waited for.

The second effect of the present invention is that when the subsidiary unit of the digital cordless telephone set can receive both the radio wave from the radio base station connected to the public line and that from the master unit connected to the private line, the continuous waitable time can be made longer than that in the prior art while simultaneously waiting for both the radio waves.

This is because when one of the public line and the private line is assigned to the priority system and the other to the nonpriority system on the basis of detection information from the sensor to set the incoming call wait period of the nonpriority system to be longer than the normal period, the frequency of turning on the main power supply of the subsidiary unit can be decreased to minimize current consumption in the incoming call wait mode.

The above and many other objects, features and additional advantages of the present invention will become manifest to those versed in the art upon making reference to the following detailed description and accompanying drawings in which preferred embodiments incorporating the principles of the present invention are shown by way of illustrative examples.

DETAILED DESCRIPTION OF THE PREFERRED EMBODIMENT

A preferred embodiment of the present invention will be described below with reference to the accompanying drawings.

Figure 1:
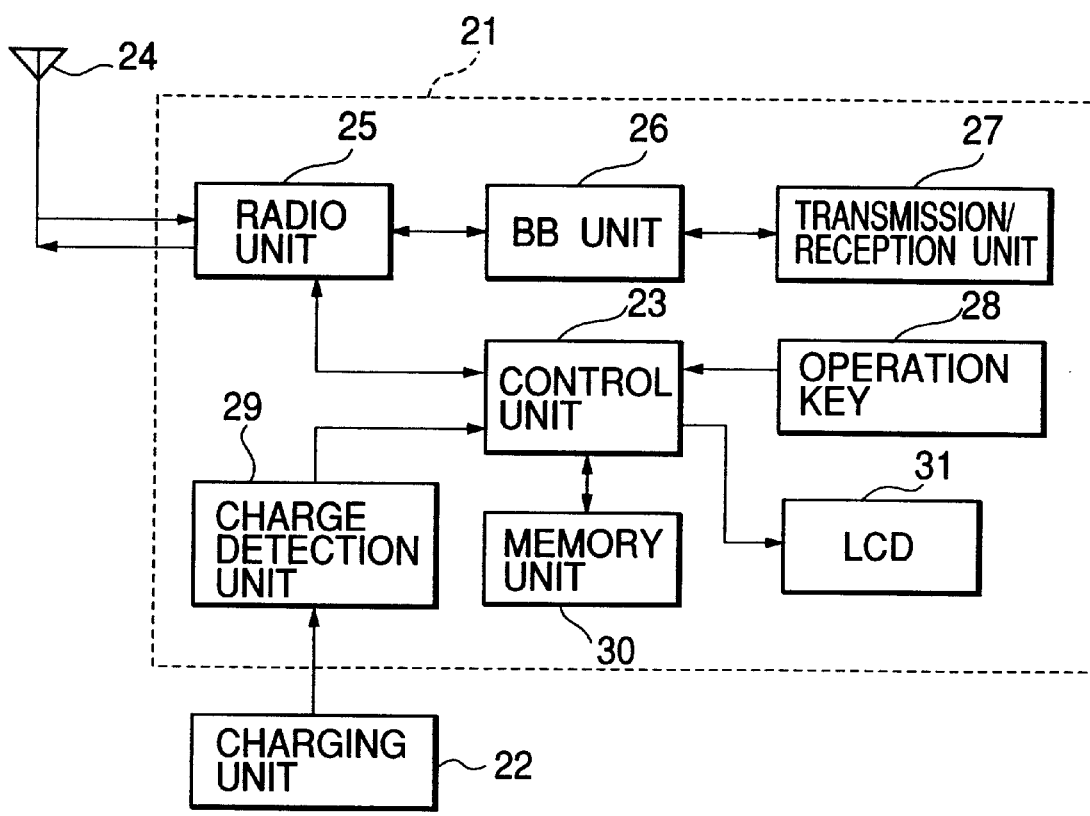
FIG. 1 is a block diagram showing the schematic arrangement of a prior art.
Figure 2:
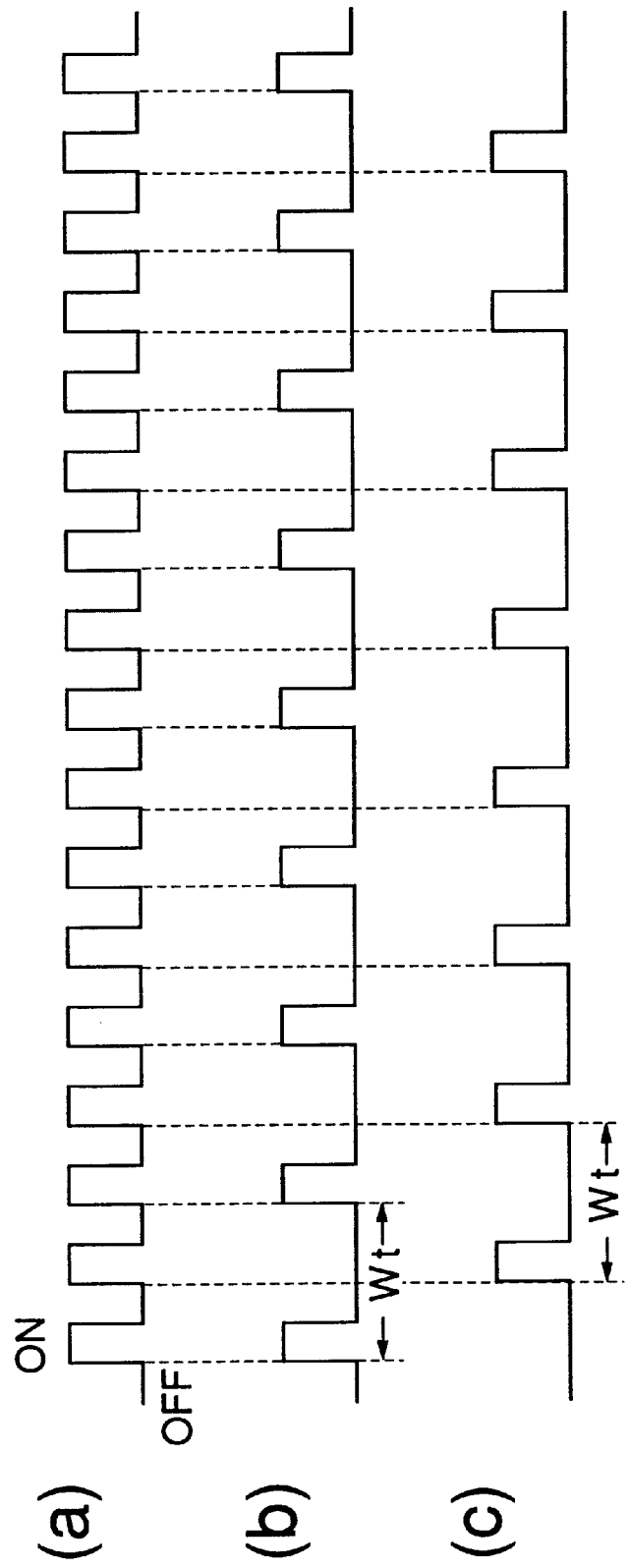
FIGS. 2A to 2C are timing charts of signals in the simultaneous wait mode of conventional public and private lines in which (a) shows the timing chart in a main power supply control, (b) shows the timing chart in a priority system reception, and (c) shows the timing chart in a non-priority system reception.
Figure 3:
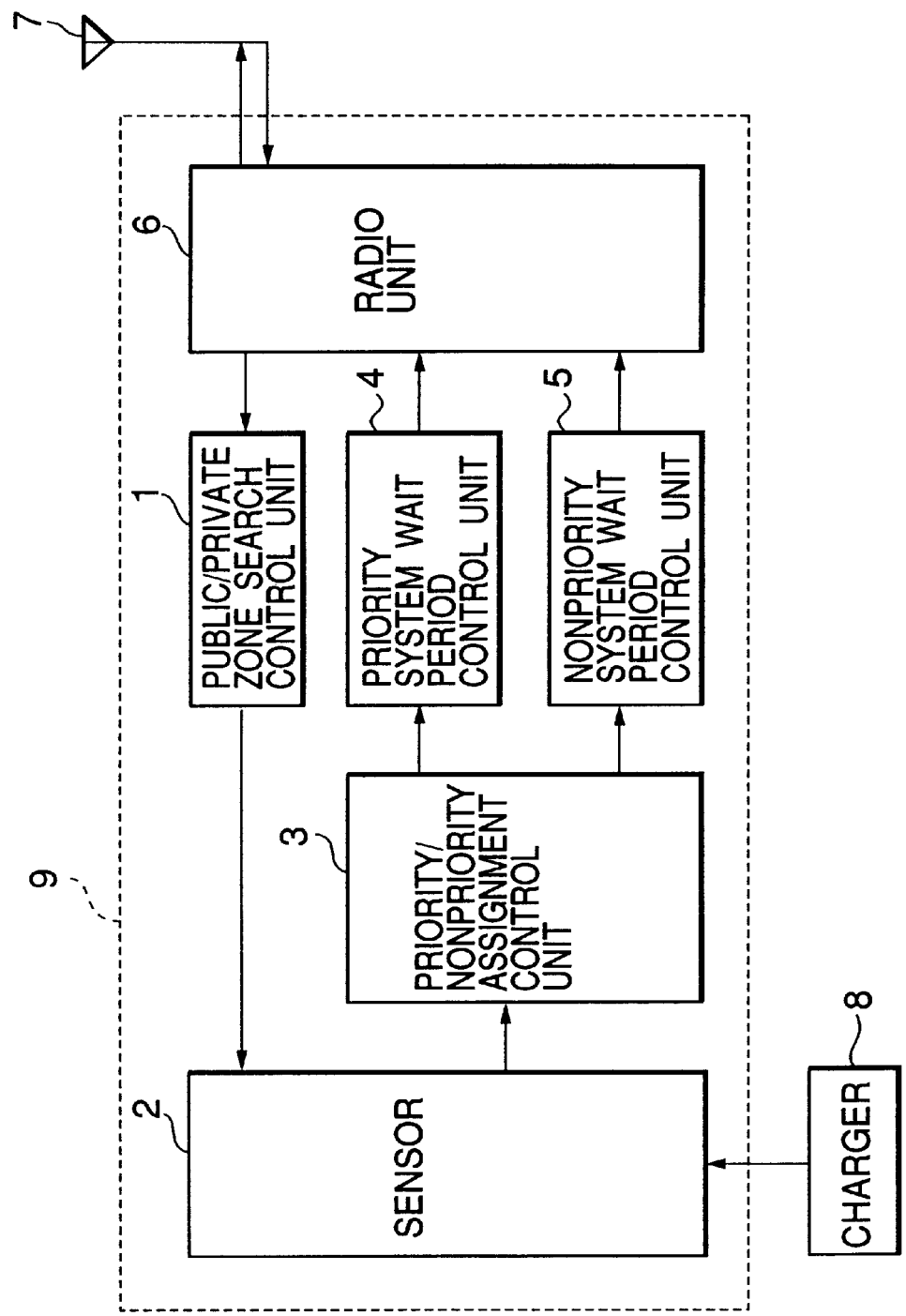
FIG. 3 is a block diagram showing the schematic arrangement of an embodiment of the present invention.

The schematic arrangement of a digital cordless telephone set of the present invention will be described first with reference to FIG. 3.

Reference numeral 1 denotes a public/private zone search control unit which detects whether a subsidiary unit 9 can receive both a radio wave from a radio base station (not shown) connected to a public line and a radio wave from a master unit (not shown) connected to the private line.

A sensor 2 detects whether the subsidiary unit 9 is placed on the charger.

Reference numeral 3 denotes a priority/nonpriority assignment control unit 3. Upon receiving information from the sensor 2, the priority/nonpriority assignment control unit 3 assigns the private line to the priority system and the public line to the nonpriority system when the subsidiary unit 9 is placed on a charger 8, or the public line to the priority system and the private line to the nonpriority system when the subsidiary unit 9 is not placed on the charger 8.

A priority system wait period control unit 4 controls the period for waiting for a radio wave from the line assigned to the priority system.

A nonpriority system wait period control unit 5 controls the period for waiting for a radio wave from the line assigned to the nonpriority system.

Reference numeral 6 denotes a radio unit; and 7, an antenna, which transmits/receives radio waves to/from both the radio base station connected to the public line and the master unit connected to the private line. The charger 8 charges the battery of the subsidiary unit 9.

Figure 4:
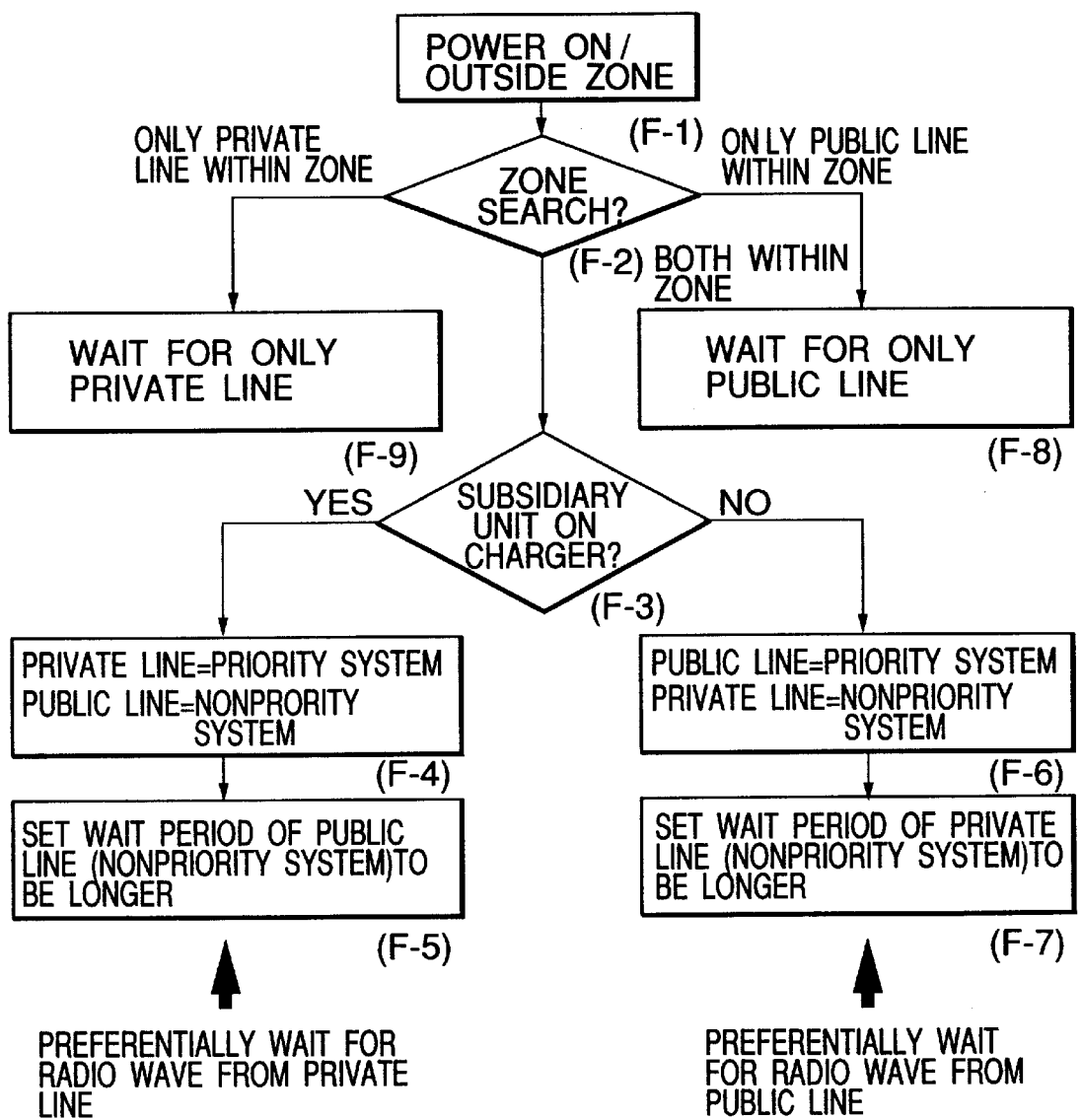
FIG. 4 is a flow chart showing the operation of the embodiment of the present invention.

The operation of the digital cordless telephone set of the present invention will be described next with reference to the flow chart in FIG. 4.

When the subsidiary unit is powered on, or when one or both of the radio waves from the public and private lines cannot be received (outside the zone) (F-1), the public/private zone search control unit 1 detects whether the radio waves from the public and private lines can be received (zone search) (F-2). If both the radio waves from the public and private lines can be received (both within the zone), the sensor 2 detects whether the subsidiary unit 9 is placed on the charger 8 (F-3).

Figure 5:
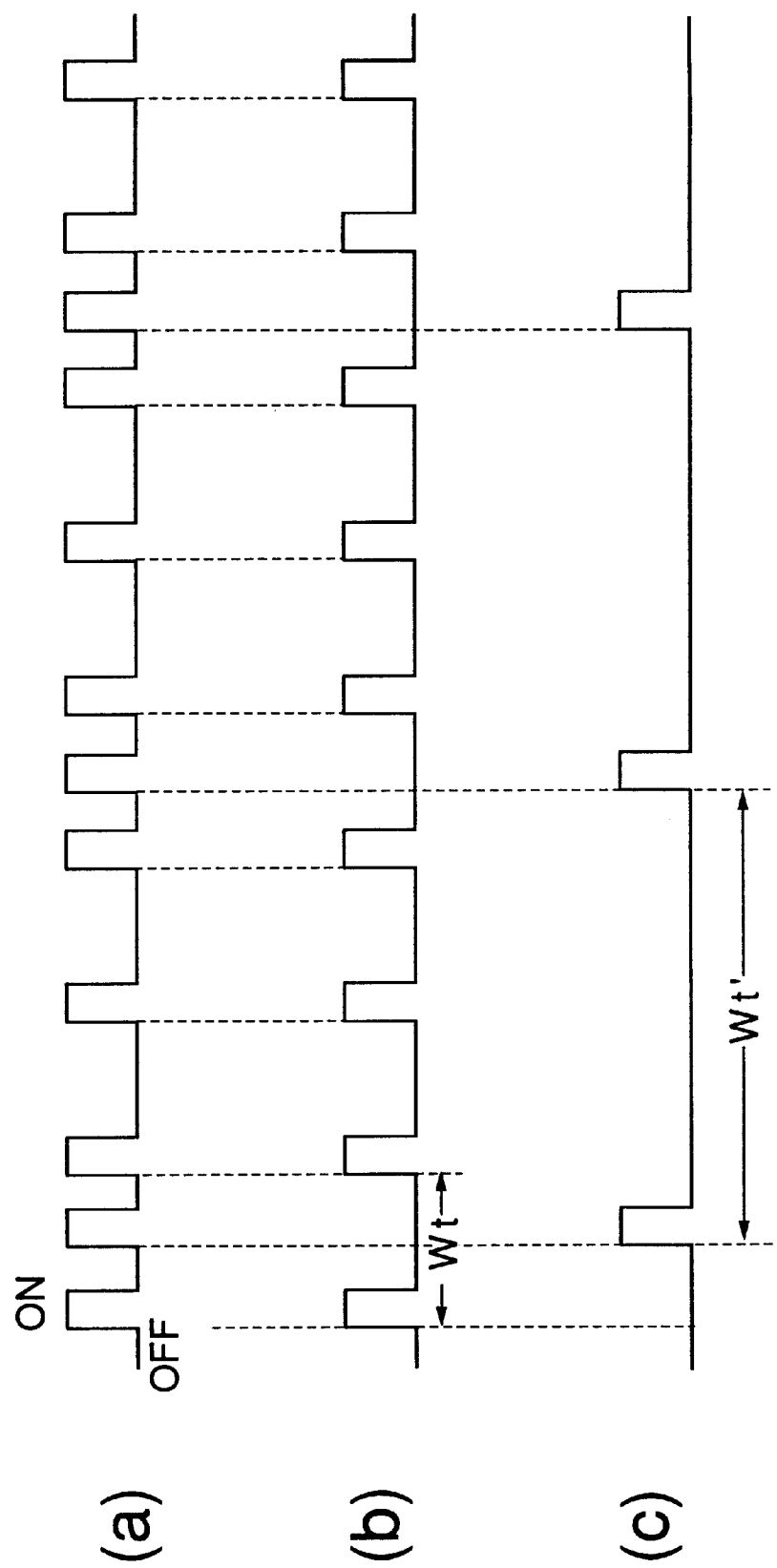
FIGS. 5A to 5C are timing charts of signals in the simultaneous wait mode of the present invention in which (A) shows the timing chart in a main power supply control, (B) shows the timing chart in a priority system reception, and (C) shows the timing chart in a nonpriority system reception.

When information received from the sensor 2 represents that the subsidiary unit 9 is placed on the charger 8, the priority/nonpriority assignment control unit 3 assigns the private line to the priority system and the public line to the nonpriority system (F-4). At this time, as is apparent from the signal timing charts in FIGS. 5A to 5C, the nonpriority system wait period control unit 5 sets the period Wt' for waiting for the radio wave from the public line as the nonpriority system to be fairly longer than the period Wt for waiting the radio wave from the private line as the priority system, thereby decreasing the frequency of turning on the main power supply of the subsidiary unit 9 to minimize the current consumption in the incoming call wait mode (F-5).

On the other hand, when information received from the sensor 2 represents that the subsidiary unit 9 is not placed on the charger 8, the priority/nonpriority assignment control unit 3 assigns the public line to the priority system and the private line to the nonpriority system (F-6). At this time, as is apparent from the signal timing charts in FIGS. 5A to 5C, the nonpriority system wait period control unit 5 sets the period for waiting for the radio wave from the public line as the nonpriority system to be longer than the normal period, thereby decreasing the frequency of turning on the main power supply of the subsidiary unit 9 to minimize the current consumption in the incoming call wait mode (F-7).

In step (F-2), when only one of the radio waves from the public and private lines can be received (within the zone), only the radio wave of the receivable line (within the zone) is waited for. For the line which cannot be received (outside the zone), it is continuously detected whether the radio wave can be received (zone search) (F-8 and F-9).

Figure 6:
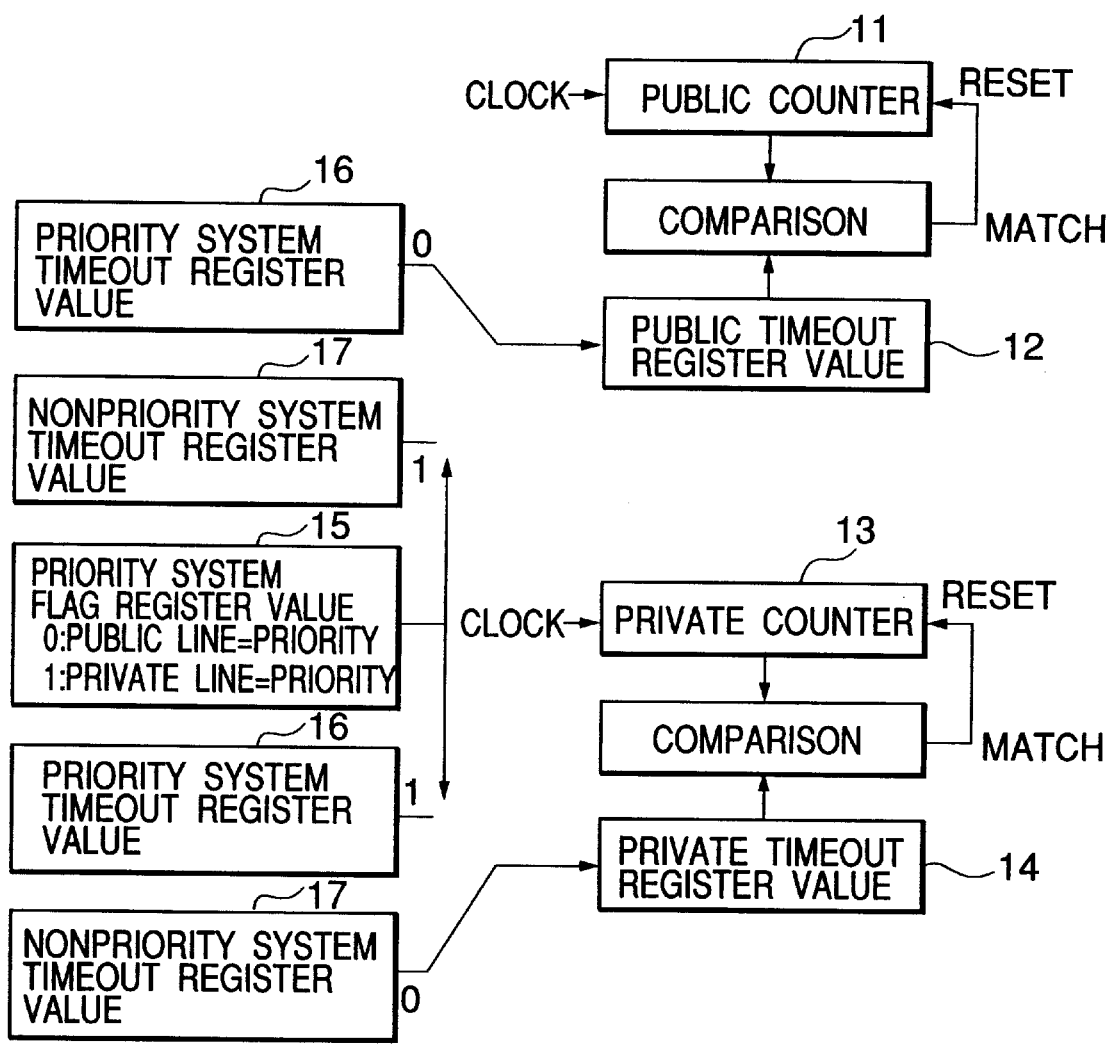
FIG. 6 is an explanatory view showing the wait period control operation of the present invention.

The wait period control operation of the present invention will be described next with reference to FIG. 6.

(1) Wait Timing of Public Line

A public counter 11 determines the wait operation timing of the public line. The public counter 11 is always compared with a public timeout register value 12. When the two values match, the public counter 11 is reset.

(2) Wait Timing of Private Line

A private counter 13 determines the wait operation timing of the private line. The private counter 13 is always compared with a private timeout register value 14. When the two values match, the private counter 13 is reset.

(3) Priority System Flag

The priority/nonpriority assignment control unit 3 (FIG. 3) switches a priority system flag register value 15 depending on whether the subsidiary unit 9 is placed on the charger 8. When the public line is to be assigned to the priority system, the flag is set at 0. When the private line is to be assigned to the priority system, the flag is set at 1.

(4) Determination of Wait Period

When the priority system flag 15 is set at 0, a priority system timeout register value 16 is copied to the public timeout register value 12, and a nonpriority system timeout register value 17 is copied to the private timeout register value 14. When the priority system flag 15 is set at 1, the priority system timeout register value 16 is copied to the private timeout register value 14, and the nonpriority system timeout register value 17 is copied to the public timeout register value 12.

If the subsidiary unit 9 can receive both the radio waves from the public line and the private line, the nonpriority system timeout register value 17 can be set to be larger than the normal value to prolong the wait period for the radio wave from the nonpriority system.

The following application can also be made as the wait period control operation of the present invention.

A learning function is added to perform control such that the timeout value of the timer in the system with a high speech communication frequency is automatically decreased, and that in the system with a low speech communication frequency is automatically increased.

With this arrangement, the wait period of the system with the high speech communication frequency can be automatically made short, and that of the system with the low speech communication frequency can be automatically made long while the user is unconscious of it.

According to the present invention, when it is determined that both the radio wave from the radio base station connected to the public line and that from the master unit connected to the private line can be received, the public/private zone search control unit 1 actuates the sensor 2 to detect whether the subsidiary unit 9 is placed on the charger 8. When information received from the sensor 2 represents that the subsidiary unit 9 is placed on the charger 8, the priority/nonpriority assignment control unit 3 assigns the private line to the priority system and the public line to the nonpriority system. If the subsidiary unit 9 is not placed on the charger 8, the priority/nonpriority assignment control unit 3 assigns the public line to the priority system and the private line to the nonpriority system. The nonpriority system wait period control unit 5 sets the incoming call wait period of the nonpriority system to be longer than the normal period. With this arrangement, the frequency of turning on the main power supply of the subsidiary unit 9 can be decreased to minimize the current consumption in the incoming call wait mode.

What is claimed is:

1. A digital cordless telephone set as a subsidiary unit, comprising:

a receiver capable of receiving both a radio wave from a radio base station and a radio wave from a master unit;

means for detecting that both the radio wave from said radio base station and the radio wave from said master unit can be received;

means for switching between whether only one of the radio wave from said radio base station and the radio wave from said master unit is received and whether both the radio waves are simultaneously received;

means for detecting whether said subsidiary unit is placed on a charger; and means for assigning one of a private line and a public line to a priority system and the other to a nonpriority system when both said radio wave from said radio base station and said radio wave from said master unit are simultaneously received and depending on whether said subsidiary unit is placed on said charger;

wherein incoming call wait periods of said priority system and said nonpriority system are changeable.

2. A telephone set according to claim 1, wherein when it is detected that said subsidiary unit is placed on said charger, said private line is assigned to said priority system and said public line is assigned to said nonpriority system, and when said subsidiary unit is not placed on said charger, said public line is assigned to said priority system and said private line is assigned to said nonpriority system.

3. A telephone set according to claim 1, wherein said telephone set has a function of automatically controlling incoming call wait periods of said priority system and said nonpriority system.

* * * * *